March 24, 1931. J. R. S. SMITH 1,798,043
INTERNAL COMBUSTION ENGINE
Original Filed Dec. 30, 1926  4 Sheets-Sheet 1
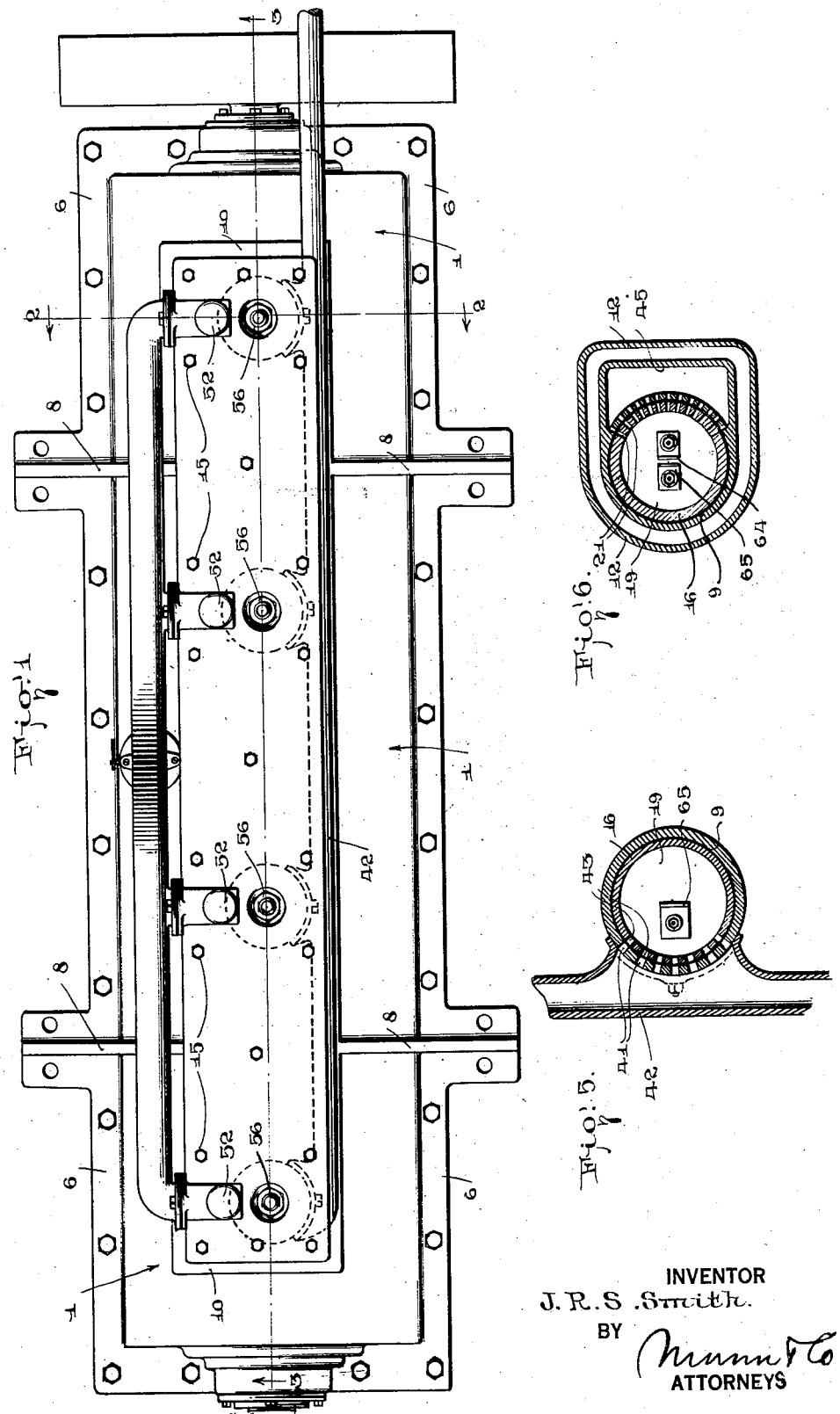
INVENTOR
J. R. S. Smith.
BY Munn & Co
ATTORNEYS

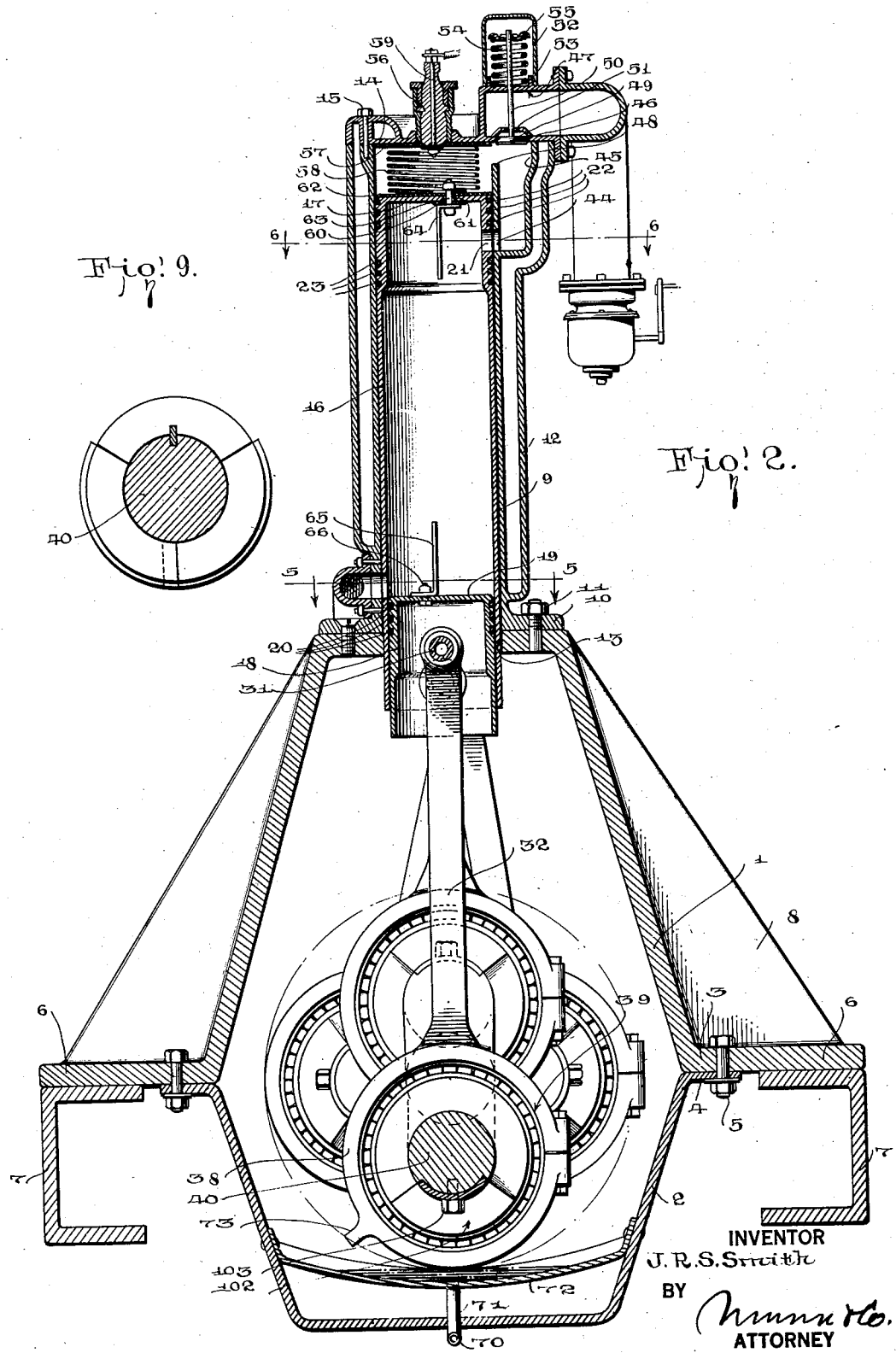

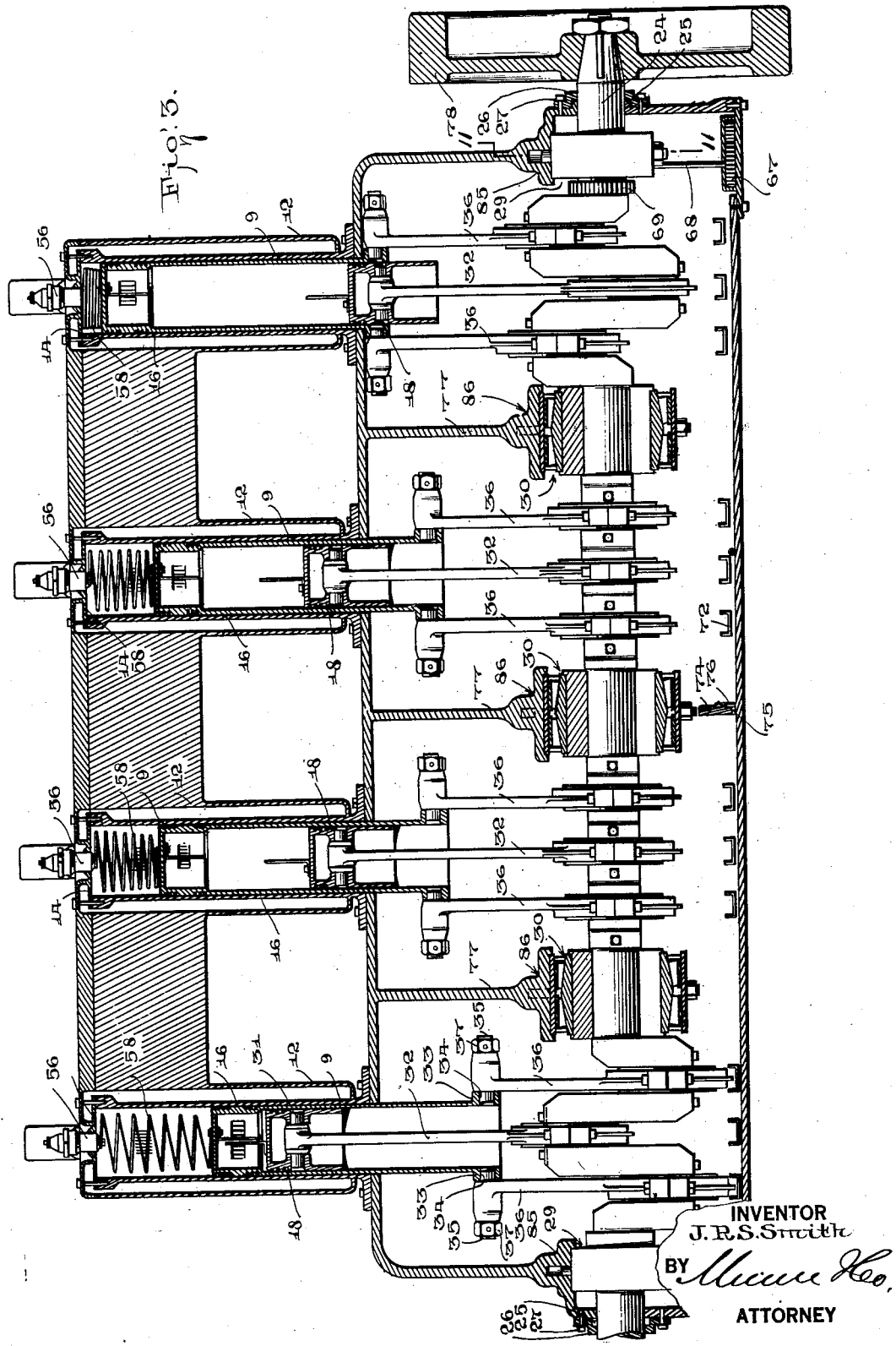

March 24, 1931.    J. R. S. SMITH    1,798,043
INTERNAL COMBUSTION ENGINE
Original Filed Dec. 30, 1926    4 Sheets-Sheet 4
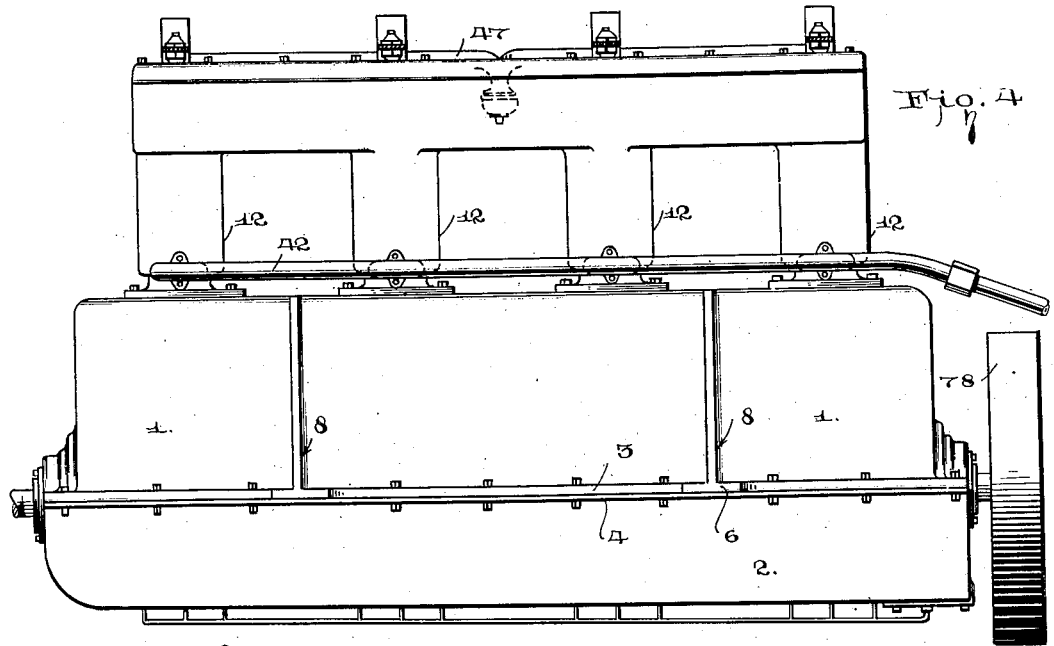
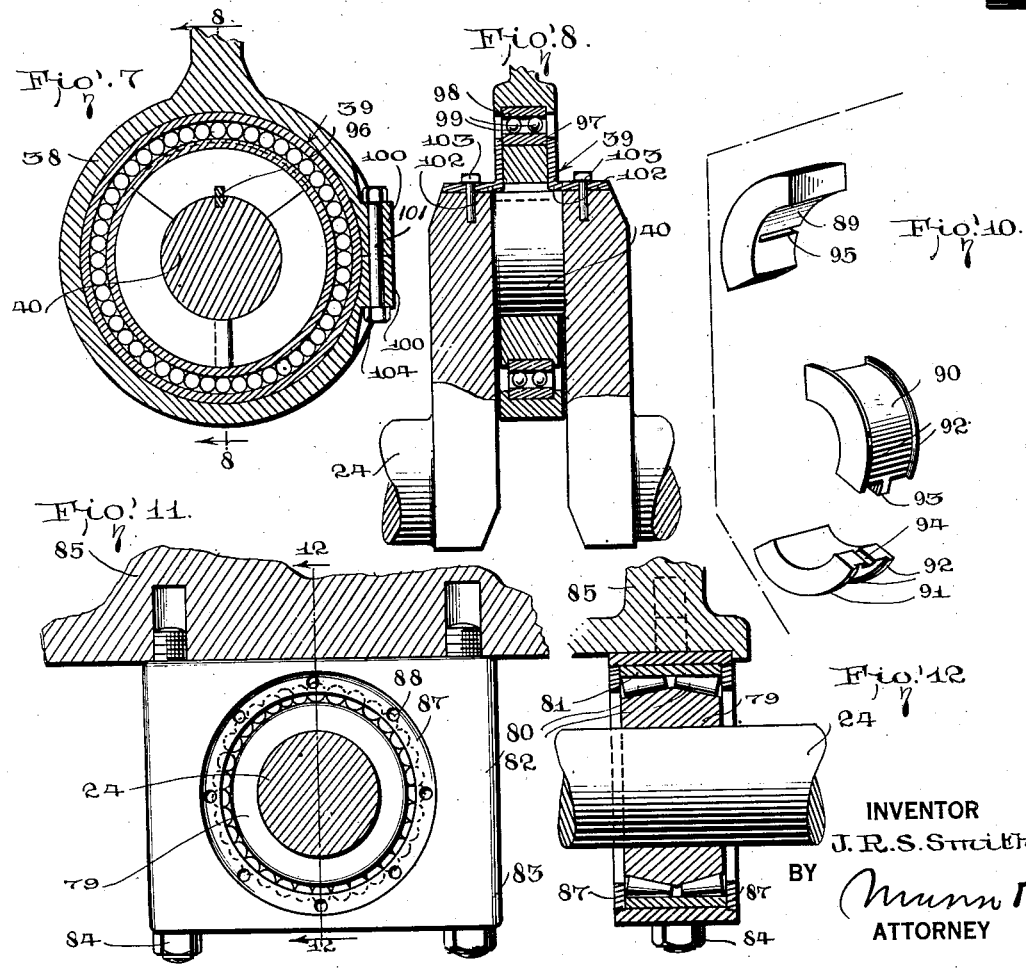
INVENTOR
J. R. S. Smith
BY Munn & Co
ATTORNEY Patented Mar. 24, 1931

1,798,043

UNITED STATES PATENT OFFICE

JOSEPH R. S. SMITH, OF PLACERVILLE, COLORADO, ASSIGNOR OF ONE-HALF TO JOHN H. ADAMS, OF TELLURIDE, COLORADO

INTERNAL-COMBUSTION ENGINE

Application filed December 30, 1926, Serial No. 158,032. Renewed August 8, 1930.

My invention relates to improvements in internal combustion engines, and it consists in the combinations, constructions and arrangements herein described and claimed.

An object of the invention is the provision of an internal combustion engine which affords facilities for making use of practically all the energy that can be derived from the explosion of a given combustible charge in a cylinder to transmit motion to an associated crank shaft, whereby an engine embodying the invention and of a given size will produce a relatively great amount of power with a given fuel consumption.

A further object of the invention is the provision in an internal combustion engine of novel anti-friction bearing assemblies for supporting the crank shaft of the engine and for connecting the connecting rods of the engine with the crank shaft.

A still further object of the invention is the provision of an internal combustion engine which will be reliable in use, not likely to get out of order easily, and thoroughly practical commercially.

Other objects and advantages of the invention will be apparent from the following description, considered in conjunction with the accompanying drawings, in which Figure 1 is a plan view of a four cylinder internal combustion engine embodying the invention, Figure 2 is a section substantially along the line 2—2 of Figure 1, Figure 3 is a section substantially along the line 3—3 of Figure 1, Figure 4 is a side elevation of the improved engine, Figure 5 is a section substantially along the line 5—5 of Figure 2, Figure 6 is a section substantially along the line 6—6 of Figure 2, Figure 7 is a section through the crank shaft, showing one of the bearing assemblies for connecting the crank shaft with a connecting rod in end elevation, Figure 8 is a section substantially along the line 8—8 of Figure 7, Figure 9 is a transverse section through the crank shaft with the sectional bushing of the associated anti-friction bearing assembly shown in elevation, Figure 10 is a perspective group view of the sections of the bushing exhibited in Figure 9, Figure 11 is a section substantially along the line 11—11 of Figure 3, and Figure 12 is a section substantially along the line 12—12 of Figure 11.

In the accompanying drawings I have shown an internal combustion engine embodying the invention and comprising four cylinders arranged in a straight line but it is to be understood that the improved engine may comprise any desirable number of cylinders and that such cylinders may be relatively arranged to produce an engine of the V-shaped type of construction.

The improved engine may include a crank case that comprises an upper section 1 and a lower or oil pan section 2. The sections 1 and 2 of the crank case have superposed flanges 3 and 4, respectively, at their meeting edges secured together by fastening devices, such as the nuts and bolts indicated at 5, as clearly shown in Figures 2 and 4. The flanges 3 of the upper section 1 of the crank case are provided with laterally extending arms 6 which are adapted to rest on spaced side members 7 of the engine supporting means and which may be attached to the supporting members 7 in any suitable known manner. The flanges 3 and the arms 6 are connected with the side portions of the upper section of the crank case by reinforcing webs 8. The cylinders 9 of the internal combustion engine are superimposed on the top of the upper section 1 of the crank case and may have outwardly extending flanges 10 at their lower edges secured by fastening devices 11 to the top of the crank case. The cylinders are provided with water jackets 12 and may be cast en bloc or separately from one another, as desired. The top of the upper section 1 of the crank case, of course, is provided with openings, as at 13 in Figure 2 in register with the lower ends of the bores of the cylinders. The upper end of each cylinder 9 is covered by a cylinder head 14 which is secured on the associated cylinder by fastening devices, such as the cap screw indicated at 15 in Figure 2. A relatively long tubular piston 16 that is closed at its upper end by an integral head 17 is provided for each cylinder and depends from the bore of the associated cylinder through the underlying opening 13 in the top of the crank case into the space within the upper section 1 of the crank case. The piston 16 will be hereinafter referred to as the outer piston. Each outer piston 16 has an inner tubular piston 18 reciprocable therein. Each piston 18 is relatively short and is tubular in form, being closed at its upper end by an integral head 19 and being provided adjacent to its upper end with a plurality, preferably 3, piston rings 20. Each outer piston 16 is provided at a substantial distance from its upper end with a lateral fuel intake port which may comprise a plurality of circumferentially spaced radial orifices 21, as shown in Figure 6 and each outer piston 16 is provided above said fuel intake port with a set of three piston rings 22 and below said fuel intake port with a set of three piston rings 23. A crank shaft 24 extends longitudinally of the crank case and protrudes from the opposite ends of the crank case through suitably formed openings at the meeting edges of the end portions of the upper and lower sections of the crank case, packing rings 25 being provided around the end portions of the crank shaft at the ends of the crank case, and retained by the internally shouldered rings 26 and the cap screws 27 in position to prevent escape of liquid from the crank case between the ends of the crank shaft and the openings through which the ends of the crank shaft extend. The crank shaft is journaled in end main bearings 29 and intermediate main bearings 30 which will be hereinafter more fully described.

Each inner piston 18 is provided with a wrist pin 31 to which is pivotally attached the upper end of a relatively long connecting rod 32. Each outer piston 16 is provided at its lower end with a pair of diametrically opposite outwardly extending bosses 33 which have alined internally screw threaded sockets 34. The inner end portions of alined oppositely extending wrist pins 35 are screwed into the sockets 34 at the lower end of each outer piston 16. The upper ends of the relatively short connecting rods 36 are pivotally supported on the wrist pins 35 and are retained thereon by the nuts 37, as best seen in Figure 3. Each relatively long connecting rod 32 thus is flanked by a pair of the shorter connecting rods 36. Each connecting rod 32 or 36 has its lower end portion formed to produce an eye member 38 of the split ring type in which is disposed a ball bearing assembly generally indicated at 39 for connecting that connecting rod anti-frictionally with a crank pin 40 of the aforesaid crank shaft. The ball bearing assembly 39 is of special construction and will be hereinafter described in detail. The crank pin to which each connecting rod 32 is attached is located intermediate the crank pins to which the associated connecting rods 36 are attached and the crank pin to which the connecting rod 32 of the inner piston of each cylinder is attached is spaced 180 degrees on the crank shaft from the crank pins to which the shorter connecting rods 36 for the outer piston of that cylinder are attached.

The lower end portion of each cylinder 9 is provided with a lateral exhaust port that is located above the top of the crank case and which may comprise a series of circumferentially spaced orifices 41 which open into an exhaust manifold 42 as best seen in Figure 5. The lower end portion of each outer piston 16 is provided with circumferentially spaced orifices 43 which respectively are similar to the orifices 41 and are adapted to register with the latter when the outer piston 16 is at the limit of its upward stroke in the associated cylinder as shown in Figure 2 and, at that time, the lateral orifices 21 in the upper end portion of the outer piston will register with similarly spaced lateral intake orifices 44 in the upper end portion of the cylinder, the orifices 21 and 43 being in opposite sides of the outer piston. Each cylinder is provided with a fuel intake chamber 45 which communicates at its top through an opening 46 in the cylinder head with an intake manifold 47. The aforesaid orifices 44 establish communication between the lower part of the intake chamber 45 of each cylinder and the space within that cylinder below the limit of upward movement of the outer piston in that cylinder while a lateral port 48 establishes communication between the upper part of the intake chamber 45 and the space within the associated cylinder above the limit of upward movement of the outer piston in that cylinder.

The opening 46 has its wall suitably beveled to provide a seat for a downwardly opening intake valve 49. The valve 49 has a stem 50 extending through a spider 51 that is located within the intake manifold 47. The stem 50 also extends through an opening in the upper part of the intake manifold into a combined dust cap and spring housing 52 that is threadedly engaged with an upstanding tubular boss 53 on the intake manifold. An expansion spring 54 is disposed within the cap 52 between the intake manifold and a stop or adjusting nut 55 on the upper end portion of the stem 50, whereby the valve 49 will be yieldingly maintained on its seat 46 by the action of the spring 54.

Each cylinder head 14 has a central opening in which is secured a spark plug 56. The cylinder head is insulated by a plate of porcelain 57 or other suitable heat resistant insulating material, from a coiled spring 58 that is disposed in the upper part of the cylinder and has its upper end secured to the lower end of the central electrode, 59 of the spark plug, the central electrode of the spark plug thus also being insulated from the cylinder head. The lower end of the spring 58 is attached to a bolt 60 which extends through an opening 61 in the head of the outer piston within that cylinder. The bolt 60 is spaced from the wall of the opening 61 and is insulated from the associated outer piston by a suitable insulating plate 62 on the head of the outer piston and a second insulating plate 63 that is disposed on the bolt 60 against the inner face of the head of the outer piston. The insulating plate 62 also serves to insulate the outer piston from the spring 58. The bolt 60 is of electrical conducting material and carries a terminal 64 which depends within the upper part of the outer piston slightly at one side of the axial line of the outer piston. A cooperating terminal 65 is secured at 66 on the head of the inner piston within the associated outer piston slightly at the opposite side of the axial line of the outer piston and has an upstanding arm that is adapted to move close to the depending arm of the upper terminal 64 when the outer piston is at the limit of its downward movement in the associated cylinder and the inner piston is at the limit of its upward movement in the associated outer piston, a spark gap thus being provided between the terminals 64 and 65. The second electrode of the spark plug 56 of course is grounded to the cylinder and the terminal 65 is grounded through the inner piston and the outer piston to the associated cylinder. The lower section 2 of the crank case is adapted to hold a supply of oil and is inclined so that such oil tends to return to the intake of a pump 67 that is shown more or less diagrammatically in Figure 3 and which may be of any suitable known construction. The pump 67 may be operated by power that is transmitted thereto through any suitable motion transmitting mechanism, such as indicated at 68, between the pump and a gear 69 on the adjacent end of the crank shaft. The pump preferably has a delivery conduit 70 provided with branches, as at 71, leading to transverse oil troughs 72. The oil troughs 72 are located in the lower section of the crank case underneath the eye members 38 of the connecting rods so that dipper projections 73 on the eye members 38 of the connecting rods will dip into the troughs 72 and throw oil therefrom upwardly within the crank case for lubricating the bearings within the crank case when the crank shaft rotates. A transverse partition plate 74 is provided in the lower section 2 of the crank case intermediate the ends of the crank case for preventing undue flow or rush of oil in the bottom of the crank case, the partition 74 having an orifice 75 in its lower part controlled by a flap valve 76 which permits gradual return of oil in the bottom of the crank case from the end of the crank case that is opposite the top toward the top.

The aforesaid intermediate main bearings 30 are carried at the lower ends of the supporting arms 77 which depend within the crank case from the top of the crank case.

The crank shaft carries a fly wheel 78. It will be observed by referring to Figure 4 that the supporting arms of the crank case are secured to the side members of the engine support at the level of the axial line of the crank shaft so as to permit the crank shaft and the fly wheel to be lowered between the side members of the engine supporting means after the lower section of the crank case has been detached from the remainder of the crank case without there being any necessity of removing the upper section of the crank case and the remainder of the engine from the engine supporting means.

Each of the main bearing assemblies 29 and 30 comprises an inner race ring 79 that is secured on the crank shaft and which has its outer face sloping oppositely from its transverse median line toward its ends as is usual for rolling contact with the tapering roller bearings 80. (See Figures 11 and 12.) An outer race ring 81 is spaced from the inner race ring 79 by the roller bearings 80 and is clamped between the upper and lower sections 82 and 83, respectively, of the cap ring of the roller bearing assembly. The upper and lower sections of the cap ring of each main bearing assembly are secured together by stud bolts 84 and the end main bearing assemblies are secured by the shanks of the associated stud bolts 84 to enlarged lower edge portions 85 of the ends of the upper section of the crank case while the intermediate bearing assemblies 30 are secured by the shanks of the associated stud bolts with enlarged lower end portions 86 of the aforesaid pendent supporting arms 77. The outer race ring and the rollers 80 are retained in place on the inner race ring 79 by end retaining rings 87 which are screwed into the ends of the bearing caps after the sections 82—83 of such bearing caps have been secured together by the bolts 84. The retaining rings 87 may have spaced openings 88 adapted to be engaged by a socket wrench or like tool so that such retaining rings can be conveniently screwed into and out of the associated bearing caps.

Each crank pin bearing assembly 39 comprises a bushing made up of three segmental sections 89, 90 and 91, respectively. The sections 90 and 91 preferably are substantially equal in size with each other and the section 89 may be slightly shorter than each of the sections 90 and 91. Each of the sections 90 and 91 is provided with outwardly extending radial flanges 92 at its side edges and the section 90 has an extending tongue 93 at one end adapted to fit in a groove 94 in the adjacent end of the section 91. The section 89 has its outer face continuously smooth throughout its area and the section 89 is provided with a transverse key-way 95 for the reception of a spline or key 96 on the associated crank pin so that the sections of the bushing will be locked to the crank pin when they are disposed on the crank pin as shown to advantage in Figure 7. A ball race comprises an inner race ring 97 and an outer race ring 98 which is maintained in spaced concentric relation with the inner race ring 97 by the ball bearings 99. The inner race ring 97 fits on the bushing 89—90—91 between the flanges 92 of the sections 90 and 91 of said bushing while the outer race ring is held in the eye member 38 of the associated connecting rod. As previously stated, the eye member 38 is of the split ring type of construction and the meeting ends thereof have apertured out-turned lugs 100 connected by a suitable fastening device, such as the bolt and nut indicated at 101, whereby a clamping action on the outer race ring will be produced when the fastening device 101 is tightened.

The race ring of the bearing assembly for each crank pin is sufficiently large to be slipped over the crank shaft knuckles onto the crank pin with which it is to be associated. The section 91 of the bushing then is slipped to place on the crank pin between the inner race ring and the crank pin. The section 90 of the bushing then is inserted between the inner race ring and the crank pin and is arranged on the crank pin with the tongue 93 engaged with the groove 94. The section 89 of the bushing then is driven back to place between the sections 90 and 91 and so that the spline 96 on the crank pin will enter the transverse groove 95 in the inner face of the section 89, the crown portions of the knuckles of the crank shaft at opposite ends of the crank pin first having been planed off to permit the section 89 to be driven to place on the crank pin between the inner race ring 97 and the crank pin and between the sections 90 and 91 of the bushing. Displacement of the section 89 from locking position on the crank pin is prevented by a pair of angular retaining members 102, each of which is curved longitudinally along an approximately 90 degree-arc of a circle and each of which has an attaching arm or portion secured to the adjacent knuckle of the crank shaft by a cap screw 103 so that the remaining portion of the retaining member 102 will extend outwardly and at one side of the section 89 of the bushing beyond the outer face of the bushing and the members 102 of each crank pin assembly therefore not only will prevent displacement of the section 89 of the bushing but also will serve as an additional safeguard against axial displacement of the inner race ring 97 and will serve to lock the inner race ring to the crank shaft. Since the ball races on the crank pin bearing assemblies are sufficiently large to be placed on the crank shaft over the knuckles of the crank shaft, the crank shaft need not be cut nor the ball races split in order to permit the application of the ball race assemblies to the crank pins or their removal.

From the foregoing description of the various parts of the device, the operation thereof may be readily understood. The ignition circuit for the spark plug of each cylinder is not illustrated in the drawings but it will be understood that any suitable ignition circuit may be provided and may have associated therewith a suitable timer, also not shown, so that a spark will jump from the terminal 64 to the terminal 65 at the time a combustible charge has been suitably compressed between the heads of the inner and outer pistons of each cylinder. The outer piston of each cylinder and the inner piston of each cylinder respectively are at the upper and lower limits of their strokes just after their associated crank pins pass "dead center". Assuming that the outer piston is at the end of its upward stroke and the inner piston is at the end of its downward stroke at the beginning of a cycle, the consequent downward movement of the outer piston in the cylinder will cause opening of the valve 49 against the action of the spring 54 and gaseous fuel will be sucked from the intake manifold into the space within the cylinder above the head of the outer piston. On the upward stroke of the outer piston, the fuel will be compressed between the head of the outer piston and the cylinder head and when the outer piston has nearly completed its upward stroke, the intake orifices 21 therein will begin to register with the orifices 44 in the cylinder wall and the exhaust orifices 43 in the lower part of the outer piston will begin to move into register with the exhaust orifices 41 in the lower part of the cylinder wall and the compressed fuel charge from above the outer piston will pass through the registering orifices 21—44 into the outer piston and any burnt gases or gases of combustion will pass from the lower part of the outer piston through the registering orifices 43—41 into the exhaust manifold. The outer piston now moves downward again in the cylinder and the inner piston moves upward, whereby the gaseous fuel in the inner piston will be compressed. The fuel charge in the outer piston will be desirably compressed when the outer piston has reached the limit of its downward movement and the inner piston has reached the limit of its upward movement, at which time the terminals 64 and 65 will be in adjacent but slightly spaced juxtaposed relation, as shown in the left hand cylinder of Figure 3. The spark between the terminals 64 and 65 will ignite the combustible charge and the consequent explosion will cause the outer piston to be driven upwardly in the cylinder and the inner piston downwardly in the outer piston. The points of connection of the connecting rods for the outer cylinder and the connecting rods for the inner cylinder are spaced 180 degrees apart on the crank shaft so that the downward movement of the inner piston and the upward movement of the outer piston under the influence of the energy that is derived from the explosion of the combustible charge between the heads of such pistons will mutually contribute to the production of a torque on the crank shaft. The burnt gases will be driven out through the registering exhaust orifices 43—41 when the outer piston is near the limit of its upward stroke and the inner piston is near the limit of its downward stroke and a fresh charge of gaseous fuel that has been compressed between the head of the outer piston and the cylinder head will flow into the outer piston when the outer piston is at the limit of its upward movement as shown in the right hand cylinder of Figure 3. It therefore will be manifest that the improved cylinder and piston construction affords facilities for the production of a relatively great amount of power as the result of the explosion of a given quantity of gases fuel in a cylinder of a given size. Any desirable number of cylinders may be used in an engine embodying the invention and the corresponding connecting rods of adjacent cylinders preferably are spaced 90 degrees apart on the crank shaft of the engine when a four cylinder engine is provided as shown in Figure 3 so that the resultant torque on the crank shaft will be balanced and uniform during the operation of the engine. The spacing of the corresponding connecting rods for adjacent cylinders on the crank shaft will vary according to the number of cylinders when said cylinders are arranged in a straight line as shown in Figure 3. Obviously, the cylinders may be relatively arranged in V-shape, if desired, in which event the corresponding connecting rods of the cylinders of each pair would be connected with the same crank pins.

Obviously, my invention is susceptible of embodiment in forms other than that which is illustrated in the accompanying drawings, and I therefore consider as my own all such modifications and adaptations thereof as fairly fall within the scope of the appended claims.

I claim:—

1. In an internal combustion engine, a cylinder closed at one end, interacting pistons operable inwardly of the open end of said cylinder, ignition electrodes carried by opposed portions of said pistons for cooperation one with the other, one of said electrodes being grounded to and the other insulated from their respective pistons, an ignition circuit terminal mounted in the closed end of said cylinder, and a contractile and expansible current conducting means within said cylinder and extending between said insulated electrode and said circuit terminal.

2. In an internal combustion engine, a cylinder closed at one end, interacting pistons operable inwardly of the open end of said cylinder, ignition electrodes carried by opposed portions of said pistons for cooperation one with the other, one of said electrodes being grounded to and the other insulated from their respective pistons, an ignition circuit terminal mounted in the closed end of said cylinder, and a current carrying means having the form of a coiled spring within said cylinder and extending between said insulated electrode and said circuit terminal.

JOSEPH R. S. SMITH.